(12) United States Patent
Zuberi

(10) Patent No.: US 7,565,454 B2
(45) Date of Patent: Jul. 21, 2009

(54) STATE MIGRATION IN MULTIPLE NIC RDMA ENABLED DEVICES

(75) Inventor: Khawar M. Zuberi, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 732 days.

(21) Appl. No.: 10/622,217

(22) Filed: Jul. 18, 2003

(65) Prior Publication Data

US 2005/0015469 A1 Jan. 20, 2005

(51) Int. Cl.
G06F 15/16 (2006.01)
(52) U.S. Cl. .................... 709/250; 709/212; 709/230
(58) Field of Classification Search ............... 709/250, 709/212, 230
See application file for complete search history.

(56) References Cited

U.S. PATENT DOCUMENTS

| | | | | |
|---|---|---|---|---|
| 6,067,569 | A * | 5/2000 | Khaki et al. | 709/224 |
| 6,163,834 | A * | 12/2000 | Garcia et al. | 711/206 |
| 6,490,632 | B1 * | 12/2002 | Vepa et al. | 709/250 |
| 6,512,774 | B1 * | 1/2003 | Vepa et al. | 370/401 |
| 6,687,758 | B2 * | 2/2004 | Craft et al. | 709/250 |
| 6,721,806 | B2 * | 4/2004 | Boyd et al. | 719/312 |
| 6,807,581 | B1 * | 10/2004 | Starr et al. | 709/250 |
| 6,904,519 | B2 * | 6/2005 | Anand et al. | 713/100 |
| 2002/0010841 | A1 * | 1/2002 | Rovati | 711/147 |
| 2002/0026502 | A1 * | 2/2002 | Phillips et al. | 709/219 |
| 2002/0078383 | A1 * | 6/2002 | Leerssen et al. | 713/201 |
| 2002/0124108 | A1 * | 9/2002 | Terrell et al. | 709/245 |
| 2004/0006636 | A1 * | 1/2004 | Oesterreicher et al. | 709/231 |
| 2004/0073622 | A1 * | 4/2004 | McDaniel et al. | 709/212 |
| 2004/0093389 | A1 * | 5/2004 | Mohamed et al. | 709/212 |
| 2004/0193734 | A1 * | 9/2004 | Barron et al. | 709/250 |
| 2004/0205379 | A1 * | 10/2004 | Hilland et al. | 714/5 |
| 2004/0240435 | A1 * | 12/2004 | Boucher et al. | 370/352 |
| 2004/0252709 | A1 * | 12/2004 | Fineberg | 370/412 |
| 2006/0010253 | A1 * | 1/2006 | Aiken et al. | 709/250 |

OTHER PUBLICATIONS

Renato Recio, RDMA enabled NIC (RNIC) Verds Overview, Apr. 29, 2003, pp. 1-28. Last accessed on May 21, 2007 www.rdmaconsortium.org/home/RNIC_Verbs_Overview2.pdf.*

Caitlin Bestler, RE: [rddp] comments on draft-black-rdma-concerns-00.txt., Jul. 31, 2002, IETF, pp. 1-3. Retrieved from http://www1.ietf.org/mail-archive/web/rddp/current/msg00026.html on Nov. 28, 2007.*

(Continued)

Primary Examiner—Andrew Caldwell
Assistant Examiner—Oleg Survillo
(74) Attorney, Agent, or Firm—Wolf, Greenfield & Sacks, P.C.

(57) ABSTRACT

A method is provided for transferring control between a first network interface and at least a second network interface in a same multiple network interface device after the first network interface transmits an identifier generated by the first network interface. The method includes receiving a message from the second network interface to a program component, the message indicating the reception of the identifier from a second device. Next, the method provides for querying the first network interface to supply the program component with a list of identifiers generated by the first network interface and associated memory locations in the multiple network interface device memory. If the identifier received by the second device is present in the list, the method provides for transmitting a memory location associated with the identifier to the second network interface.

20 Claims, 7 Drawing Sheets

OTHER PUBLICATIONS

Pinkerton, J., et al., "*Requirements for an RDMA Protocol*", Internet Draft, *The Internet Society* (2001), pp. 1-10.

Williams, J., et al., "*ULP Framing for TCP*", Internet Draft, *The Internet Society* (2001), Expires Sep. 2001, pp. 1-11.

Bailey, S., et al., "*ULP Framing for TCP*", Internet Draft, *The Internet Society* (2001), Expires Jan. 2001, pp. 1-21.

Simpson, Cris, "*Information Technology-SCSI RDMA Protocol (SRP)*", *Working Draft*, T10, Project 1415-D. Intel Corporation, Jul. 3, 2002 (pp. 1-70).

"*Information Technology Scheduled Transfer Protocol (ST)*", *Working Draft*, T11.1/Project 1245-D/Rev 2.7, (Feb. 1, 1999), (pp. 1-4).

"Scheduled Transfer Protocol (ST), *Information Technology Industry Council (ITI)*", (Feb. 2, 1999), (pp. 1-93).

Shah, Hemal, et al., "*Direct Data Placement over Reliable Transports (Version 1.0)*", Oct. 2002, (pp. 1-35).

Recio, R. et al., "*An RDMA Protocol Specification (Version 1.0)*", Oct. 2002, (pp. 1-60).

Hilland, Jeff, "*RDMA Protocol Verbs Specification (Version 1.0)*", Apr. 2003, (pp. 1-243).

\* cited by examiner

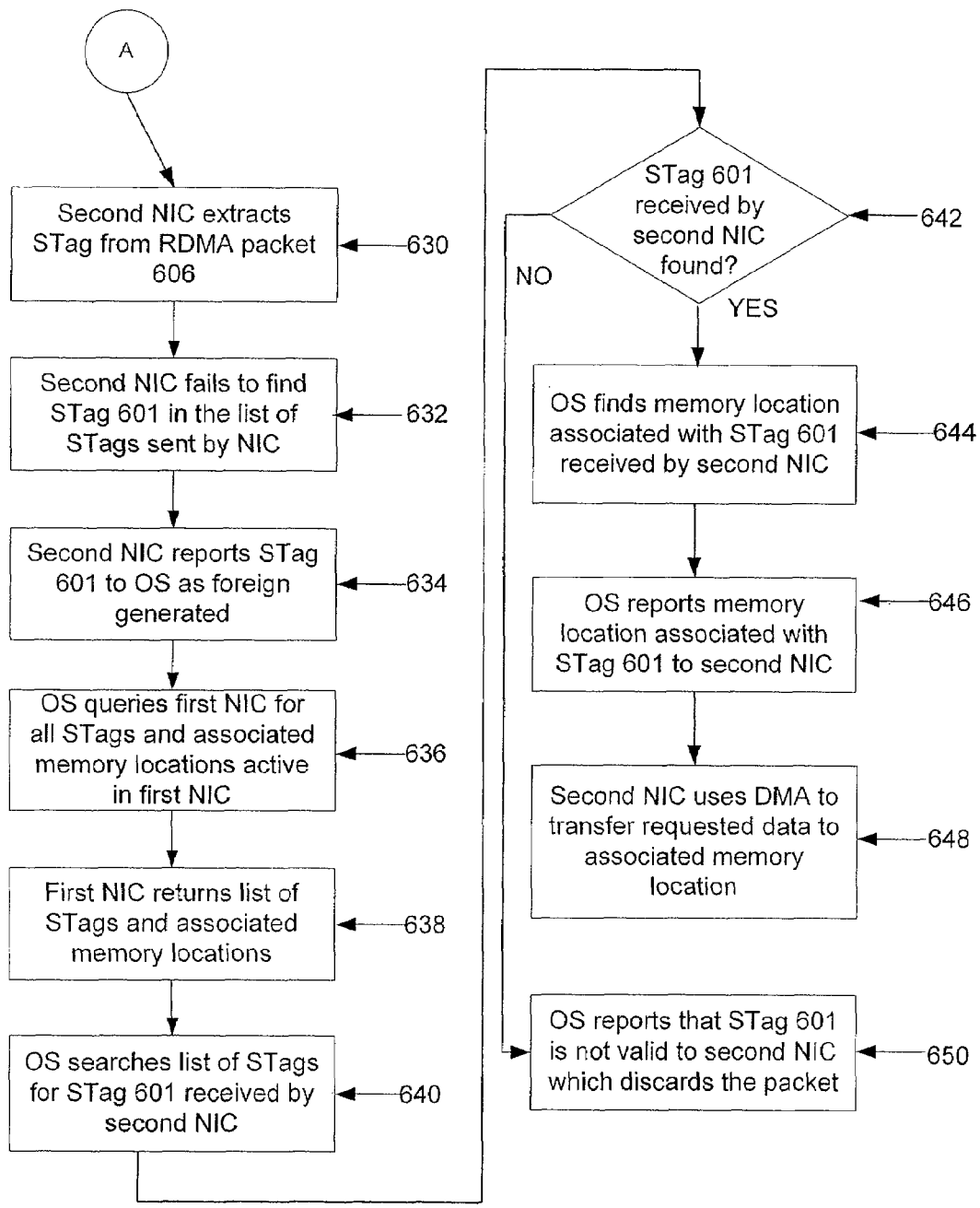

STATE MIGRATION IN MULTIPLE NIC RDMA ENABLED DEVICES

FIELD OF THE INVENTION

This invention relates generally to networking and, more particularly, relates to more efficiently use of CPU resources in a networked devices.

BACKGROUND OF THE INVENTION

Networked computing has become almost ubiquitous. Many computers in use today have multiple network interface controllers, or NICs. The speed of the data transfers allowed by these NICs has grown faster than the CPU processing power and memory system bandwidth available to process this data. Consequently, more of this processing has been moved into the NIC card themselves. While this solution works to a point, additional standards activities have been underway to develop protocols which further assist in off-loading the burden of network processing from the CPU and memory bus to the NIC.

One such protocol is remote direct memory access or RDMA. RDMA is a protocol which allows the NIC card to place a data packet in a predetermined memory location in the computer systems main memory. In the standard network protocol stack, the RDMA software resides just above the transport control protocol (TCP) software. This allows a data packet to be placed directly in system memory with minimal intervention from the CPU.

The RDMA protocol is used to make a section of main system memory on a first machine directly available to a remote second machine. The protocol associates the memory in the first machine with a handle referred to as a STag. To offload as much processing as possible from the CPU in the first machine, a NIC in the first machine generates the STag generated by a consumer comprising, for example, an application program. The STag is then sent to the second machine, which can perform a write by sending the STag back with associated data. Upon receiving this data and associated STag, the NIC in the first machine will read the STag and use a DMA transfer to move the data into the memory associated with the STag.

Data traveling over the internet can take several different routes from one machine to another. The path through the Internet will change when loading on servers changes or when servers fail all together. This can cause difficulty for a machine with multiple NICs when performing an RDMA transfer. As the route the data takes through the Internet changes, it is possible that the path chosen from the first machine to the second machine will change in a manner that causes the path between these two machines to change from NIC 1 to NIC 2 in machine 1. Recall that the NIC 1 generates the STag. Therefore, NIC 2 will have no knowledge of a STag generated by NIC 1. If the route from machine 1 to machine 2 uses NIC 1 when an STag in generated, and then the route changes to one which uses NIC 2 before machine 2 sends data to machine 1, machine 2 will return data with an STag that is unknown to NIC 2.

There is a need for a method to handle STag's generated by one NIC and received by another NIC in the same machine.

BRIEF SUMMARY OF THE INVENTION

Embodiments are directed to methods that overcome the problem of a STag arriving at a network interface that did not generate the STag. The method relies on network interfaces on a given computer having unique STags. This can be assured by the operating system. Because STags on a given computer are unique, a network interface receiving an STag generated by another network interface on the same computer is enabled to detect that the STag was generated by a different network interface. When such a STag is detected, the network interface receiving the STag passes this STag to a higher level of software, which can be an RDMA program component which resides in the OS kernel. The RDMA program component can identify which NETWORK INTERFACE generated the STag and query the associated network interface for all STags generated by this network interface and the associated addresses of the allocated memory. The address is then passed to the network interface that received the unknown STag. With the memory address, the network interface can then complete the data transfer.

More specifically, an embodiment is directed to a method for transferring control between a first network interface and at least a second network interface in a multiple network interface device after the first network interface transmits an identifier generated for use by the first network interface to a second device. The identifier can be associated with a memory location in the multiple network interface device, and the identifier and an associated data field are capable of being received by the second network interface. The method further includes receiving a message from the second network interface to a program component, the message indicating the reception of the identifier from the second device. Next, the method provides for querying the first network interface to supply the program component with a list of identifiers generated by the first network interface and associated memory locations in the multiple network interface device memory. If the identifier received by the second device is present in the list, the method provides for transmitting a memory location associated with the identifier to the second network interface. Thus, the second network interface becomes capable of transmitting the associated data field to the memory location associated with the identifier.

Another embodiment is directed to a method for transferring control between a first network interface and at least a second network interface in a host computer including the first network interface and the second network interface. The method includes receiving an identifier from a remote computer, the identifier generated by the first network interface and associated with a memory location in the host computer. Next, the method provides for sending a message to a program component indicating the reception of the identifier, the program component configured to query the first network interface for a list of identifiers generated by the first network interface and associated memory locations in the host computer. If the list of identifiers includes the identifier from the remote computer, the method provides for receiving a memory location associated with the identifier. If the list of identifiers does not include the identifier from the remote computer, the method provides for invalidating the identifier from the remote computer.

Additional features and advantages of the invention will be made apparent from the following detailed description of illustrative embodiments, which proceeds with reference to the accompanying figures.

BRIEF DESCRIPTION OF THE DRAWINGS

While the appended claims set forth the features of the present invention with particularity, the invention, together with its objects and advantages, can be best understood from the following detailed description taken in conjunction with the accompanying drawings of which:

FIGS. 6a and 6b are a flow diagram illustrating a method in accordance with an embodiment of the present invention.

DETAILED DESCRIPTION OF THE INVENTION

Figure 1:
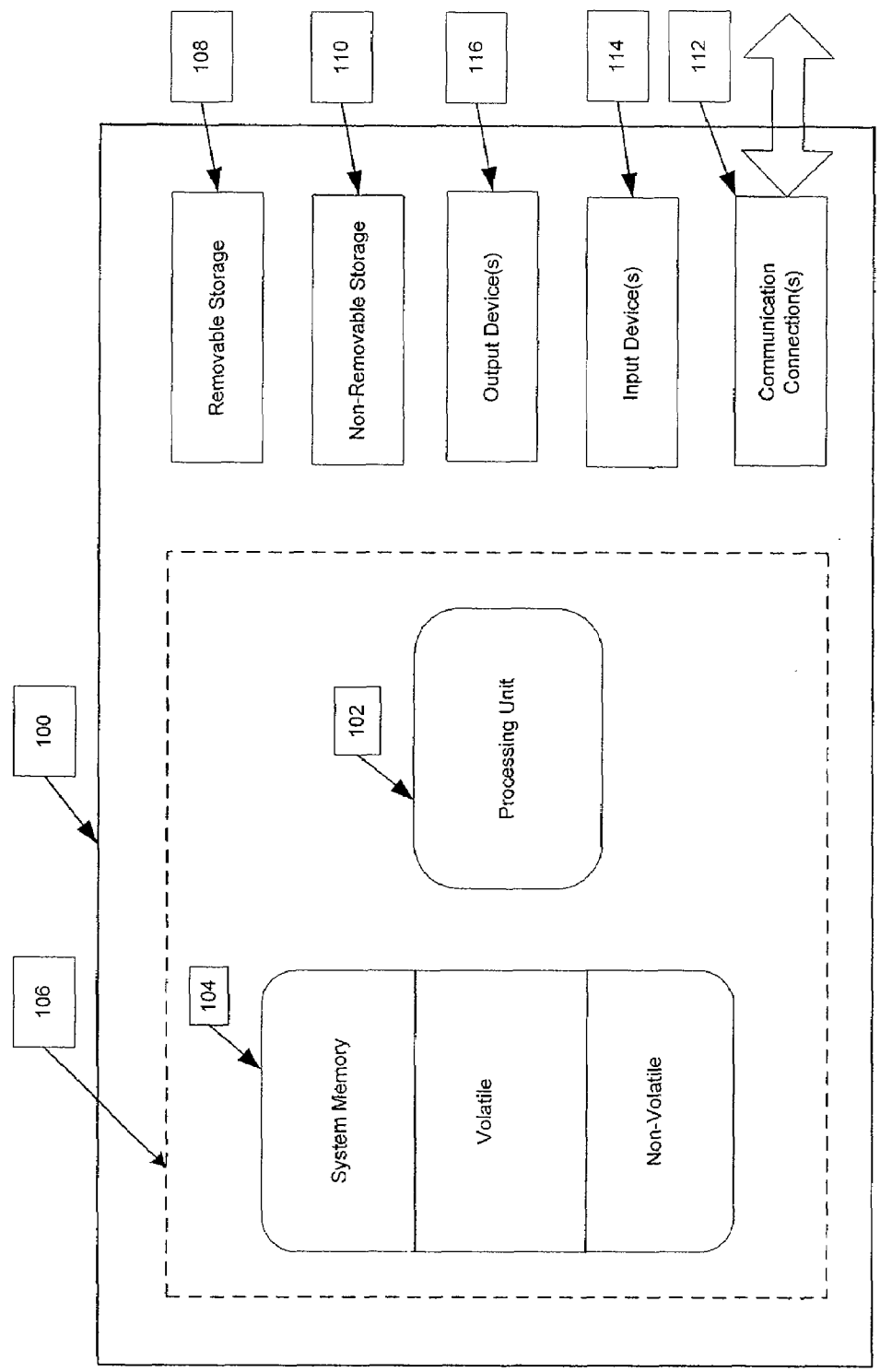
FIG. 1 is a block diagram generally illustrating an exemplary computer system on which the present invention resides.

Turning to the drawings, wherein like reference numerals refer to like elements, the invention is illustrated as being implemented in a suitable computing environment. Although not required, the invention will be described in the general context of computer-executable instructions and associated electronic circuits, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

Referring to FIG. 1, in its most basic configuration, the computing device 100 includes at least a processing unit 102 and a memory 104. Depending on the exact configuration and type of computing device, the memory 104 may be volatile (such as RAM), non-volatile (such as ROM, flash memory, etc.) or some combination of the two. The basic configuration is illustrated in FIG. 1 by a dashed lines 106. Additionally, the device 100 may also have additional features/functionality. For example, the device 100 may also include additional storage (removable and/or non-removable) including, but not limited to, magnetic or optical disks or tapes. Such additional storage is illustrated in FIG. 1 by a removable storage 108 and a non-removable storage 110. Computer storage media includes volatile and nonvolatile removable and non-removable media implemented in any method or technology for storage of information such as computer readable instructions, data structures, program modules or other data. The memory 104, the removable storage 108 and the non-removable storage 110 are all examples of computer storage media. Computer storage media includes, but is not limited to, RAM, ROM, EEPROM, flash memory or other memory technology, CDROM, digital versatile disks (DVD) or other optical storage, magnetic cassettes, magnetic tape, magnetic disk storage or other magnetic storage devices, or any other medium which can be used to store the desired information and which can accessed by the device 100. Any such computer storage media may be part of the device 100.

Device 100 may also contain one or more communications connections 112 that allow the device to communicate with other devices. The communications connections 112 are an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. As discussed above, the term computer readable media as used herein includes both storage media and communication media.

Device 100 may also have one or more input devices 114 such as keyboard, mouse, pen, voice input device, touch-input device, etc. One or more output devices such as a display, speakers, printer, etc. may also be included. All these devices are well known in the art and need not be discussed at greater length here.

Remote direct memory access is a protocol for more efficiently transporting data in a data network. This protocol was adopted by an industry consortium and approved by the consortium in October of 2002. The RDMA protocol can be used on top of the ubiquitous TCP/IP protocol. RDMA allows the transfer of data directly into a systems memory without the need for host processor intervention, thus greatly reducing the burden of data transfer on the host processor.

Remote direct memory access (RDMA) is a protocol approved by an industry consortium. It has been submitted to the Internet Engineering Task Force (IETF) for approval as an IETF standard. The goal of RDMA is to reduce the loading on the CPU required to handle network traffic. Reducing CPU loading has become necessary because the data rate of networks has grown faster than the available processing power of host CPU's and available memory bandwidth. For example, 10 Gb/s ethernet is becoming an industry standard while as recently as 10 years ago 10 Mb/s ethernet was common.

RDMA allows one machine to place data directly into the memory of another machine with minimal intervention from the CPU and minimal demands on the available memory bandwidth. RDMA has been designed to work transparently over standard TCP/IP networks in a specific version referred to as RDMA over TCP/IP. This is accomplished by embedding RDMA specific control fields to the data to be transmitted to form an RDMA packet and then embedding the RDMA packet in a TCP/IP datagram. Thus, to the network the TCP/IP packet appears the same as any other TCP/IP packet and is handled in an identical manner as a TCP/IP packet without the RDMA header would be handled.

Advances in network interface controllers (NICs) have allowed RDMA to become useful. The first such advance was the TCP/IP offload engine (TOE). The TOE technique moves much of the TCP/IP processing onto the NIC, relieving the host CPU of much of this burden. However, TOE does not by itself does not always allow zero copy of the incoming data meaning that often even if the TOE NIC uses DMA to transfer the incoming data to memory the data will still need to be copied by the network layer software. The need for this additional copy is highly dependent on the application programmers interface (API) required by the NIC and the software interfacing to the NIC. RDMA is designed to reduce or eliminate the need for this copy and therefore reduce the need for CPU intervention.

RDMA accomplishes the zero copy operation by allocating a memory location for a particular data transfer before initiating the transfer. The memory location is associated with an identifier referred to as a STag. The STag is sent as part of the RDMA header and is sent to a remote machine. If RDMA over TCP/IP is being used then this header is embedded in a TCP/IP packet. The remote machine will then return the data and the same STag embedded in another TCP/IP packet. The RDMA and TOE-enabled NIC card on the originating machine will process the TCP/IP portion of the packet and realize that there is an embedded STag in the data. It can then look up this STag, find the associated memory location, and place the data directly into this memory location using DMA. This differs from non-RDMA transfer in that a TCP/IP packet alone without RDMA would not have the associated memory location and would in general have to be passed into software to determine the final destination of the data. Once this destination was determined the software might have to use CPU resources to copy the data to a buffer appropriate for the destination application. With RDMA, this destination can be determined before the data arrives and hence no copy is required.

Security is a significant issue which was addressed by the RDMA consortium. Using RDMA, a remote computer can place commands directly into the memory of the host computer. One method used to combat this security issue is to allow STags to be invalidated after a transfer is completed. To this end, the RDMA header includes a bit to invalidate the STag. If this bit is set in a received packet, the STag is removed from a list of active STag's and any further RDMA packets received with this STag are discarded. The STag itself is a 32-bit number and if STags are quickly invalidated the chances of a malicious attempt to guess an active STag are small. While the RDMA standard does not require that STags be invalidated after a given number of transfers, for security reasons most applications using RDMA will invalidate a given STag after every data transfer is completed.

Figure 2:
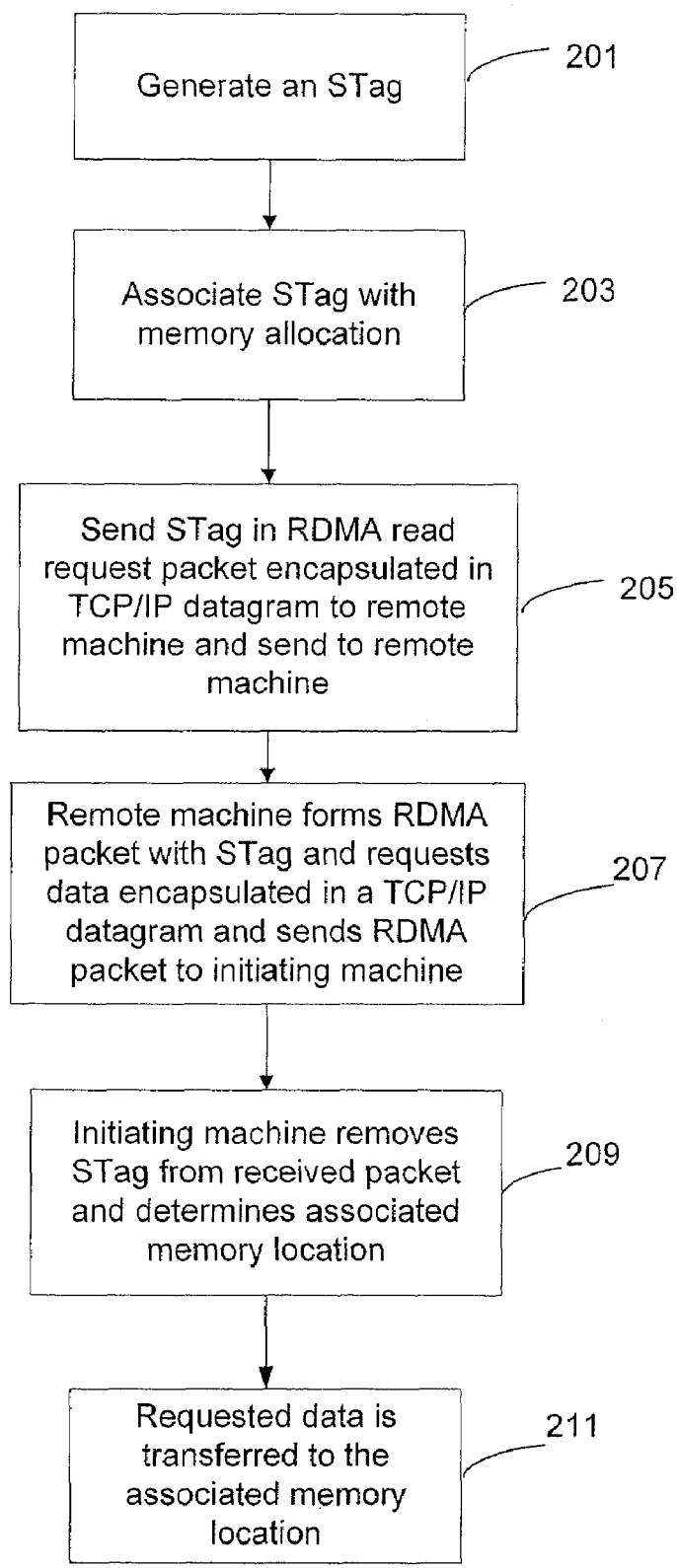
FIG. 2 is flow chart providing a overview of an RDMA data transfer in accordance with an embodiment of the present invention.

Flowchart 200 of a simplified RDMA read cycle is shown in FIG. 2. One of skill in the art with the benefit of this disclosure will appreciate that the simplified RDMA read cycle shown is exemplary for purposes of the below discussion. In flowchart 200, the data transferred over the network is assumed to use the TCP/IP protocol. It will be appreciated by one of ordinary skill in the art that other transmission protocols are possible. First is the generation of an identifier referred to as an STag in block 201. The STag is then associated with data storage, typically main system memory in block 203. Blocks 201 and 203 combined are referred to as binding. Next, the STag and a read request from an RDMA packet which have been encapsulated in a TCP/IP datagram are sent to a remote machine as a request to acquire data from the remote machine in block 205. The STag is concatenated with the desired data field in the remote machine in block 207. The concatenation of the STag and the data field is then returned to the originating machine. Once received, the STag is removed from the TCP/IP datagram and the RDMA packet and the associated memory location is ascertained in block 209. Once the memory location is known, the data is transferred to this location and becomes available to the application which initiated the data transfer in block 211.

Figure 3:
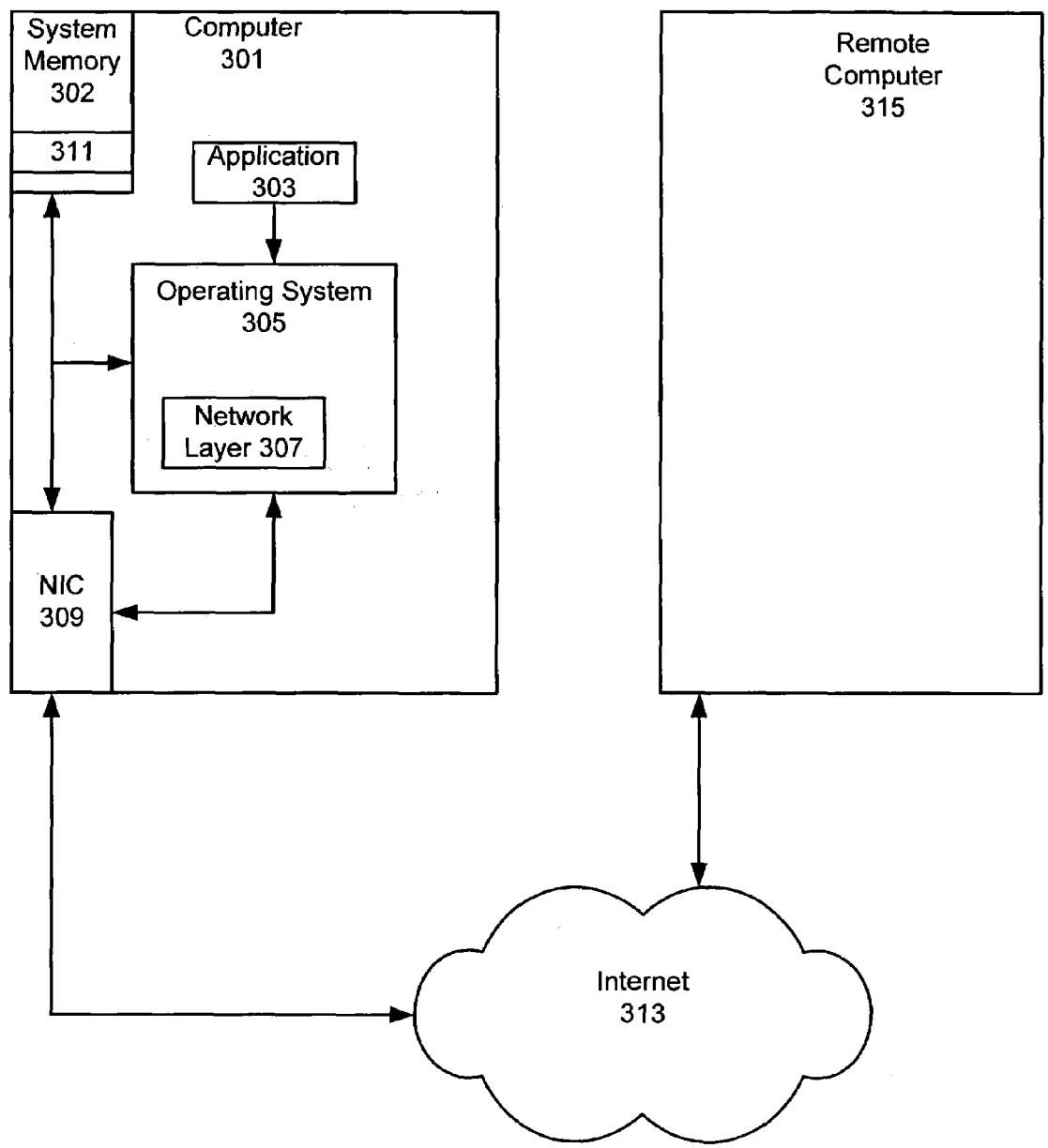
FIG. 3 is a block diagram of a networked computer system capable of implementing a typical RDMA transfer in accordance with an embodiment of the present invention.

FIG. 3 is a block diagram of a networked computer system 300 capable of implementing a typical RDMA read transfer. Computer 301 is the host computer and will be used to exemplify the RDMA transfer. Computer 301 consists of memory system 302, typically including but not limited to random access memory (RAM), application program 303, operating system 305, and NIC 309. These components are not intended to represent all the components in a typical computer. Instead, these components are those necessary to carry out an RDMA transfer. Further, memory system 302 contains an allocated block of memory which is memory allocation 311. For purposes of this description, this data storage will be referred to as memory and is usually RAM in present computer systems. However, the scope of the invention is not limited to RAM and may in general be any data storage device including but not limited to FLASH, hard disk, RAM, or any other storage device which can perform a read and a write. Computer system 301 is also referred to as a computer for purposes of this description, however this can in general be any device which can support a network interface including but not limited to PDAs, computers, cell phones, and set top boxes.

Figure 4:
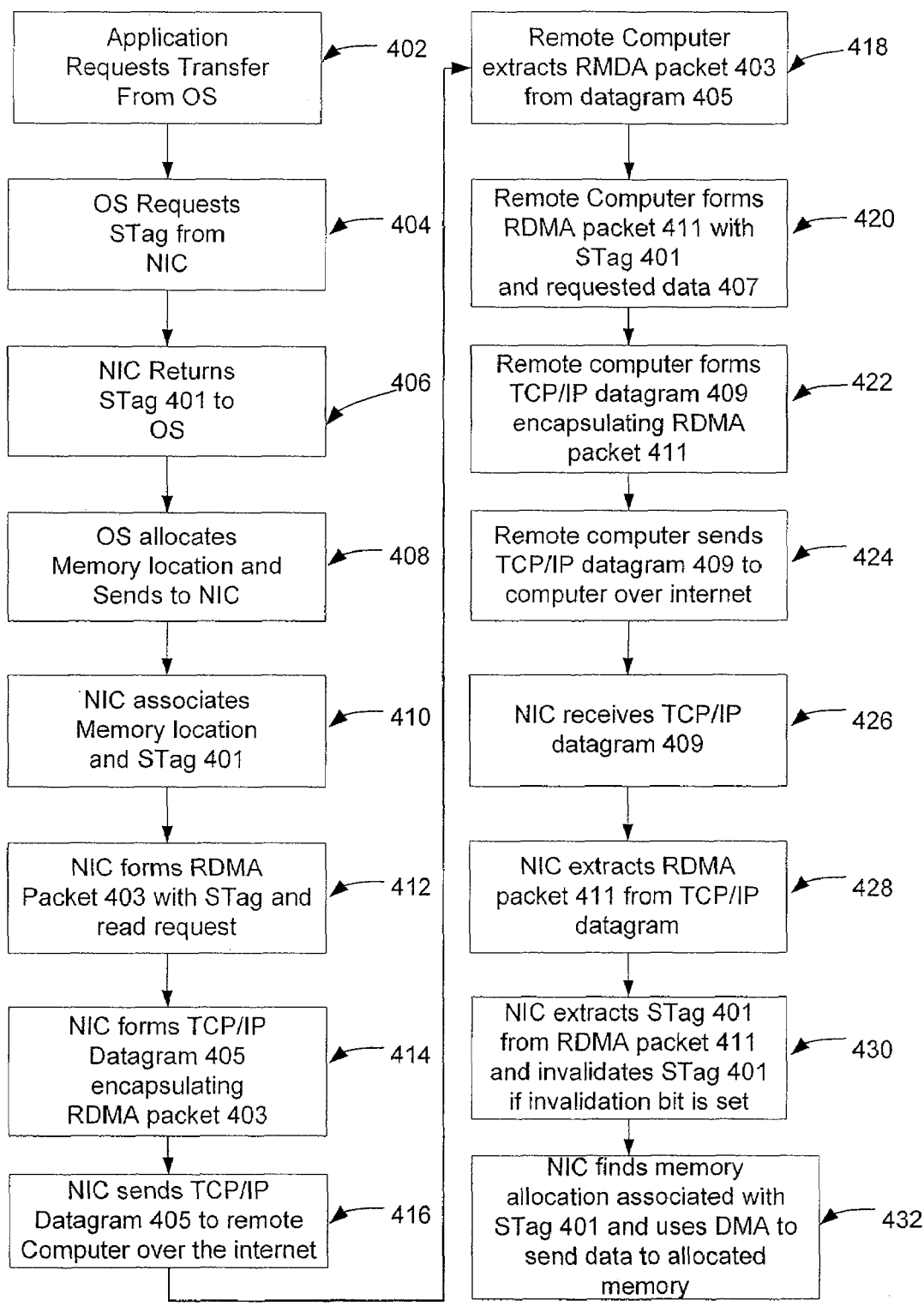
FIG. 4 is a flow diagram illustrating an implementing a standard RDMA transfer in accordance with an embodiment of the present invention.

Referring now to FIG. 3 and FIG. 4 in combination, the flow diagram of FIG. 4 illustrates an RDMA read operation. The transfer is initiated by an application 303 making a request of OS 305 to transfer data in block 402. All operating system commands in this case can occur in kernel mode. The OS 305, which may include network layer 307, determines that the request requires a network access. If NIC 309 is capable of RDMA, OS 305 can make this transfer utilizing RDMA to offload some of the processing burden from the host CPU. The RDMA transfer starts by OS 305 requesting a STag from NIC 309 in block 404. NIC 309 will return an identifier referred to as STag 401 to network OS 305 in block 406. OS 305 will then allocate memory for the transfer creating memory allocation 311 and send the address of the allocated memory 311 to NIC 309 in block 408. NIC 309 then associates memory allocation 311 with STag 401. This association allows NIC 309 to place any data arriving with STag 401 in memory allocation 311. NIC 309 then creates RDMA packet 403 in block 412. RDMA packet 403 consists of STag 401 and a command to read data. NIC 309 next encapsulates RDMA packet 403 in a TCP/IP datagram 405 in block 414. In block 416, TCP/IP datagram 405 is transmitted onto the Internet 313 which routes the TCP/IP datagram 405 to remote computer 315 in block 416. Remote computer 315 extracts RDMA packet 403 from TCP/IP datagram 405 in block 418. This extraction can be done in a NIC or in software. In block 420, STag 401 is extracted from RDMA packet 403 and in combination with the requested data 407 is used to form RDMA packet 411. In block 422 TCP/IP datagram 409 encapsulating RDMA packet 411 TCP/IP datagram 409 is then sent onto Internet 313 which routes TCP/IP datagram 409 to computer 301 in block 424. NIC 309 then receives TCP/IP datagram 409 in block 426. NIC 309 then extracts RDMA packet 411 from TCP/IP datagram 409 in block 428. In block 430 NIC 309 extracts STag 401 from RDMA packet 411 and checks the invalidation bit in the RDMA header. If this bit is set, the STag is invalidated. STag 401 is then used to retrieve the associated memory allocation 311 and the requested data 407 is sent to this memory allocation using DMA in block 432.

Note that the entire transfer of data required very little CPU intervention. OS 305 needs only make a request that the transfer take place to NIC 309, perform memory allocation 311, and report the location of this memory to NIC 309. NIC 309 handles all data transfers. Since the memory is allocated per transfer, the memory can be allocated in a manner that allows the application to directly access the data. The direct access by the application prevents the data from having to be moved after the NIC places the data in memory. This prevents the CPU from having to move a large amount of data which would consume a great deal of CPU resources in a high speed network.

Figure 5:
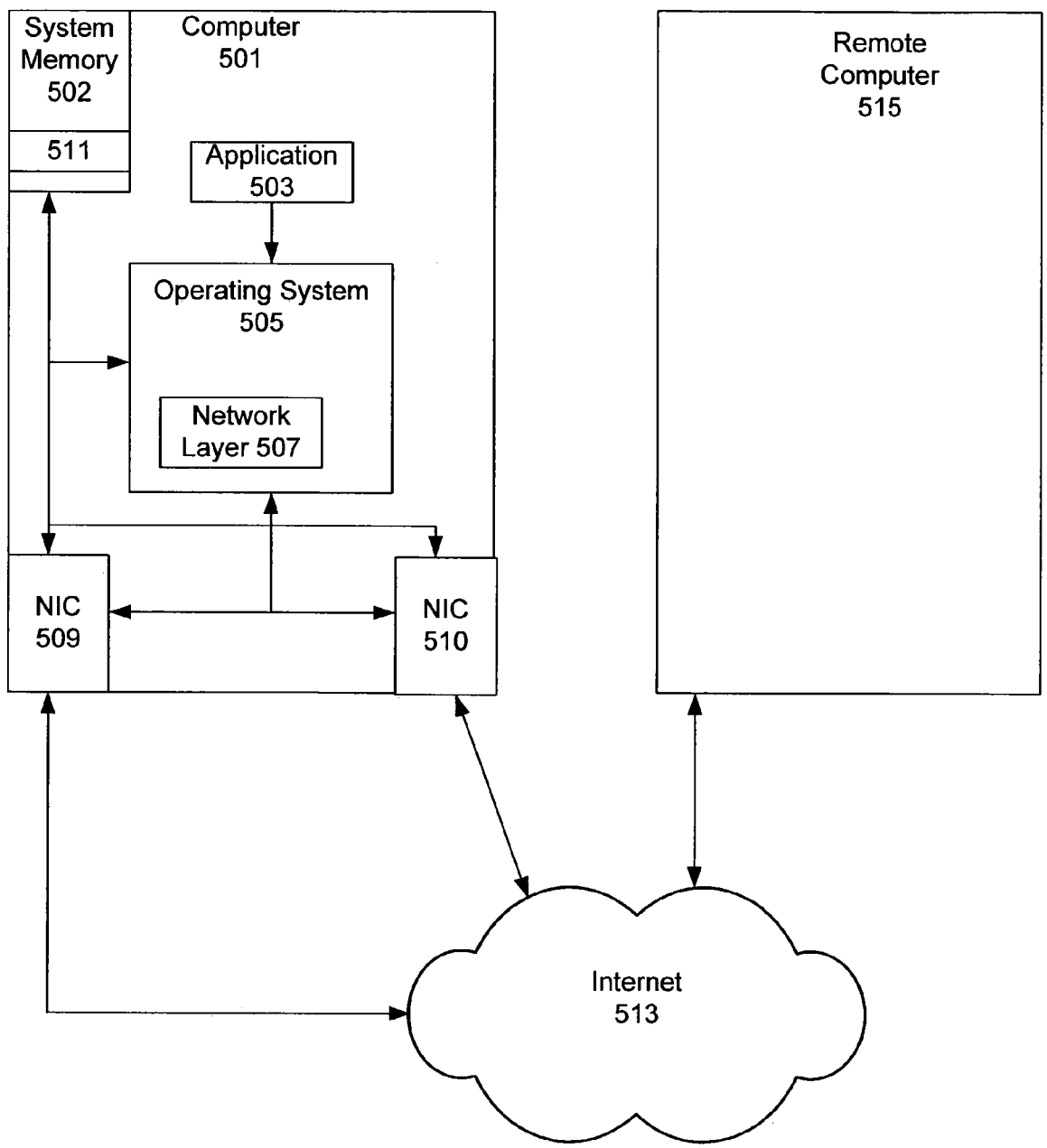
FIG. 5 is a block diagram of a networked computer system capable of implementing an embodiment of the present invention.

FIG. 5 shows a block diagram 500 of an RDMA read transfer between two networked computers in accordance with the present invention. Block diagram 500 is identical to block diagram 300 except that computer 501 has a second NIC 510. Like numbers are used to indicate like components. System memory 502 contains an allocated block of memory which is memory allocation 511. Operating system 505 may include network layer 507.

Figure 6A:
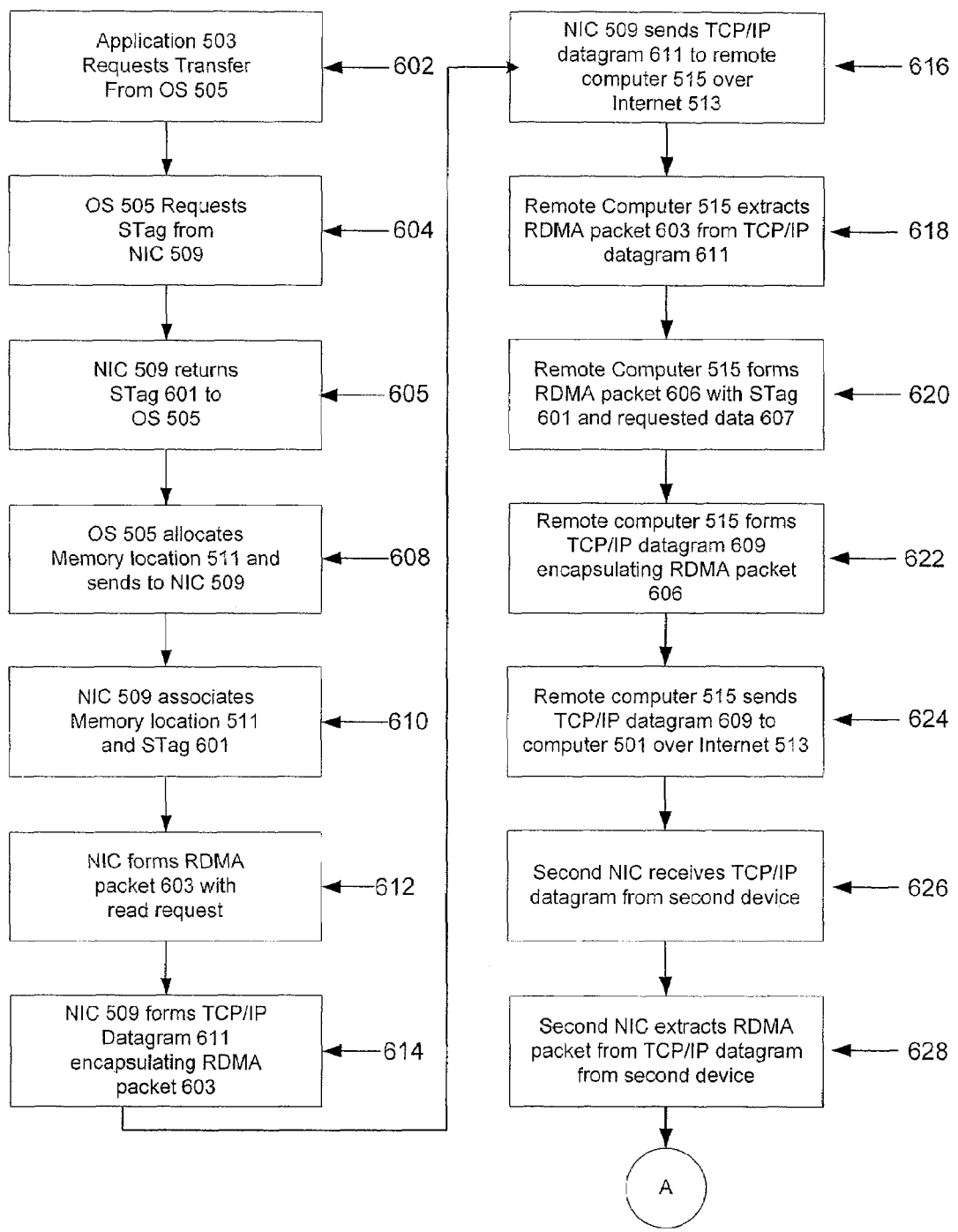

Referring to FIG. 5 in combination with FIGS. 6a and 6b, a flow diagram illustrates an RDMA read operation in accordance with an embodiment. The flow diagram makes reference to identifying numbers used in FIG. 5 for purposes of clarity. The transfer follows the same procedure as that shown in FIG. 4 until TCP/IP datagram is returned from the remote computer. In the transfer represented in FIGS. 6a and 6b however, the route used by the Internet has changed such that TCP/IP datagram 609 takes a route which terminates in NIC 510 instead of NIC 509 which initiated the transfer. Because NIC 510 did not initiate the transfer, NIC 510 has no knowledge of STag 601 and associated memory location 511. This knowledge does, however, exist in NIC 509.

FIG. 6a illustrates that an application 503 that may be implemented in remote computer 501 may request transfer of data from operating system OS 505, in step 602. In step 604, OS 505 may request STag from NIC 509, in response to which NIC 509 returns STtag 601 to OS 505, in step 605. OS 505 then may allocate memory location 511 and notify NIC 509 about it, in step 608, upon which NIC 509 may associate memory location 511 with STag 601, in step 610. In step 612, NIC 509 forms RDMA packet 603 with the read request. In step 614, NIC 509 forms TCP/IP datagram 611 encapsulating RDMA packet 603. The TCP/IP datagram 611 may then be sent by NIC 509 to remote computer 515 over the Internet 513, in step 616. Upon receiving the TCP/IP datagram 611, remote computer 515 may extract RDMA packet 603 from TCP/IP datagram 611, in step 618. In step 620, remote computer 515 forms an RDMA packet 606 with STag 601 and requested data 607. In step 622, remote computer 515 may form TCP/IP datagram 609 encapsulating RDMA packet 606. In step 624, remote computer 515 sends TCP/IP datagram 609 to computer 501 over the Internet 513. As was discussed above, the route used by the Internet may change so that, in step 626, second NIC (e.g., NIC 510) may receive TCP/IP datagram from second device.

When NIC 510 receives TCP/IP datagram 609 in block 626 of FIG. 6b, NIC 510 will perform all necessary TCP/IP processing and then extracts RDMA packet 606 in block 628. Next, STag 601 is removed from RDMA packet 606 in block 630. In block 632, NIC 510 will search a list of all valid STags created in NIC 510 but will fail to find STag 601. There are two possibilities at this point, either STag 601 is invalid or STag 601 was created by another NIC on the same computer 501. NIC 510 assumes that the later is true and, in block 634, reports STag 601 to OS 505 as an unrecognized STag. OS 505 attempts to ascertain if STag 601 is valid. To accomplish validation, in block 636 OS 505 queries NIC 509 for all valid STags and associated addresses generated by NIC 509. In block 638 NIC 509 returns the requested list. OS 505 then searches this list for STag 601, in block 640. In block 642, OS 505 makes a decision as to whether STag 601 is found. If not, block 650 is implemented in which STag 601 is reported as invalid to NIC 510. NIC 510 will then discard the packet because there is no valid memory location to transfer the packet. If a valid memory location were available, transferring a packet with an invalid STag into memory would present a security risk. Note that while in this example this branch is clearly not possible as we stated that NIC 509 generated STag 601. It is included however to illustrate the complete algorithm which must correctly handle invalid STags. If block 642 determines that STag 601 is in the list of STags generated by NIC 509, then, in block 644, OS 505 finds memory location 511 associated with STag 601. In block 646 associated memory location 511 is reported to NIC 510. The knowledge of associated memory allocation 511 allows NIC 510 to transfer requested data 607 to memory allocation 511 completing the transfer in block 648.

During the switch from one NIC to another, the CPU must actively participate in the processing of some of the RDMA protocol stack. If this situation continued indefinitely it would clearly be undesirable. Further, there may be many outstanding STags waiting to be processed on NIC 509 that will be affected by a route change. In the worst case, say, for example when a cable was unplugged from NIC 509, then all remaining STags in NIC 509 would be processed by NIC 510. The RDMA standard does not set any time limits on the lifespan of STags, therefore it is possible that the CPU would need to be involved with the use of these STags indefinitely. In practice, however, STag's are usually invalidated after each transfer and only rarely used for a large number of transfers. Therefore, in most cases, the software involvement in the transfer of STags is for a very limited duration. The invalidation of a STag can be accomplished by setting the invalidate flag in the RDMA header, though it can also occur by an explicit command from a software application. For security reasons, most applications using RDMA will invalidate a STag after one transfer even if the invalidate bit was not set.

In one embodiment of the invention, remote computer 515 also includes an application that allocates an STag, associates it with memory on remote computer 515, and sends it to the application 503 on local computer 501. Application 503 then performs an RDMA Write. More specifically, an RDMA Write packet is created which contains the remote STag as well as the data. The data and remote STag are encapsulated in a TCP/IP datagram and sent to the remote computer 515. An RDMA NIC on remote computer 515 receives this datagram, and via the STag, knows which location in memory to place the data. RDMA NIC places this data in that memory via DMA. An IP route change can affect this STag just as the case for an RDMA Read explained above and remote computer 515 can handle the route change in the same manner as that explained above for an RDMA Read.

Likewise, for simplicity, all of the above descriptions dealt with a single STag. In some embodiments, the RDMA Read operation involves two STags. Referring back to FIG. 2, even before step 201, an application on the remote computer 315 (in FIG. 3) allocates an STag (call it "remote Stag") and associates it with memory on computer 315. Then, the application on remote computer 315 sends this remote STag to the application on the local computer 301. This allows the local application 303 to perform an RDMA Read (blocks 201-211 in FIG. 2). The RDMA Read Request packet (block 205) actually carries two STags: the local STag as well as the remote STag. IP route changes can affect remote STags in the same manner as local STags. In that case, handling of the remote STag by the remote computer 315, is exactly the same as handling of the local STag by the local computer 301.

In view of the many possible embodiment to which the principles of this invention can be applied, it will be recognized that the embodiment described herein with respect to the drawing figures is meant to be illustrative only and are not to be taken as limiting the scope of invention. For example, those of skill in the art will recognize that the elements of the illustrated embodiment shown in software can be implemented in hardware and vice versa or that the illustrated embodiment can be modified in arrangement and detail without departing from the spirit of the invention. Therefore, the invention as described herein contemplates all such embodiments as can come within the scope of the following claims and equivalents thereof.

We claim:

1. A method for transferring control between a first network interface controller and at least a second network interface controller in a multiple network interface device, the method comprising:

after the first network interface controller sends a data request and an identifier associated with a memory location allocated to receive requested data in the multiple network interface device to a second device, and the identifier and an associated data field comprising the requested data are subsequently received by the second network interface controller in the multiple network interface device from the second device, receiving, by an RDMA program component of the multiple network interface device, the identifier associated with the memory location in the multiple network interface device without the associated data field, from the second network interface controller, wherein the second network interface controller has no knowledge of the identifier and the associated data field, and wherein the first network interface controller and the second network interface controller operate under a Remote Direct Memory Access (RDMA) protocol;

querying the first network interface controller to supply the RDMA program component with a list of valid identifiers generated by the first network interface controller and associated memory locations, wherein each identifier from the list of valid identifiers is associated with a location in a memory of the multiple network interface device;

determining, by the RDMA program component, whether the first network interface controller generated the identifier, wherein, when the first network interface controller generated the identifier, the list of valid identifiers comprises the identifier;

when it is determined that the first network interface controller generated the identifier, transmitting the memory location associated with the identifier to the second network interface controller, wherein the second network interface controller subsequently transmits the associated data field comprising the requested data to the memory location, and invalidating the identifier; and when the identifier is not found among the list of valid identifiers, invalidating the identifier and discarding the associated data field.

2. The method of claim 1, wherein the identifier is invalidated under control of a bit field added to the identifier and the associated data field received from the second device.

3. The method of claim 1, wherein the memory is Random Access Memory.

4. The method of claim 1, wherein the program component is a computer operating system.

5. The method of claim 1, wherein the first network interface controller and the second network interface controller operate under the RDMA protocol over TCP/IP protocol.

6. A method for transferring control between a first network interface controller and at least a second network interface controller in a host computer including the first network interface controller and the second network interface controller, the method comprising:

receiving an identifier and an associated data field in a packet from a remote computer by the second network interface controller, the identifier generated by the first network interface controller and associated with a memory location in the host computer, wherein the second network interface controller has no knowledge of the identifier and the associated data field, and wherein the first network interface controller and the second network interface controller operate under a Remote Direct Memory Access (RDMA) protocol;

extracting the identifier from the received packet;

after the identifier has been extracted from the received packet, passing the identifier associated with the memory location to an RDMA program component of the host computer;

querying, by the RDMA program component, the first network interface controller for a list of valid identifiers generated by the first network interface controller and associated memory locations, wherein each identifier from the list of valid identifiers is associated with a memory location in a memory of the host computer;

searching the list of valid identifiers for the identifier;

when the list of valid identifiers includes the identifier received from the remote computer, receiving, by the second network interface controller, the memory location associated with the identifier, wherein the second network interface controller subsequently transmits the associated data field to the memory location, and invalidates the identifier; and when the list of valid identifiers does not include the identifier received from the remote computer, invalidating the identifier received from the remote computer and discarding the associated data field.

7. The method of claim 6, wherein the identifier is invalidated under control of a bit field added to the identifier and the associated data field received from the remote computer.

8. The method of claim 6, wherein the memory is Random Access Memory.

9. The method of claim 6, wherein the program component is a computer operating system.

10. The method of claim 6, wherein the first network interface controller and the second network interface controller operate under the RDMA protocol over TCP/IP protocol.

11. A computer readable storage medium having stored therein instructions for performing acts for transferring control between a first network interface controller and at least a second network interface controller in a multiple network interface device, the acts comprising:

after the first network interface controller sends a data request and an identifier associated with a memory location allocated to receive requested data in the multiple network interface device, to a second device, and the identifier and an associated data field comprising the requested data are subsequently received by the second network interface controller in the multiple network interface device from the second device, receiving, by an RDMA program component in the multiple network interface device, the identifier associated with the memory location in the multiple network interface device without the associated data field, from the second network interface controller, wherein the second network interface controller has no knowledge of the identifier and the associated data field, and wherein the first network interface controller and the second network interface controller operate under a Remote Direct Memory Access (RDMA) protocol;

querying the first network interface controller to supply the RDMA program component with a list of valid identifiers generated by the first network interface controller and associated memory locations, wherein each identifier from the list of valid identifiers is associated with a memory location in a memory of the multiple network interface device;

determining, by the RDMA program component, whether the first network interface controller generated the identifier, wherein, when the first network interface controller generated the identifier, the list of valid identifiers comprises the identifier;

when it is determined that the first network interface controller generated the identifier, transmitting the memory location associated with the identifier to the second network interface controller, wherein the second network interface controller subsequently transmits the associated data field comprising the requested data to the memory location, and invalidating the identifier; and when the identifier is not found among the list of valid identifiers, invalidating the identifier and discarding the associated data field.

12. The computer readable storage medium of claim 11, wherein the identifier is invalidated under control of a bit field added to the identifier and the associated data field received from the second device.

13. The computer readable storage medium of claim 11, wherein the memory comprises Random Access Memory.

14. The computer readable storage medium of claim 11, wherein the program component is a computer operating system.

15. The computer readable storage medium of claim 11, wherein the first network interface controller and the second network interface controller operate under the RDMA protocol over TCP/IP protocol.

16. A computer readable storage medium having stored therein instructions for performing acts for transferring control between a first network interface controller and at least a second network interface controller in a host computer including the first network interface controller and the second network interface controller, the acts comprising:

receiving an identifier and an associated data field in a packet from a remote computer by the second network interface controller, the identifier generated by the first network interface controller and associated with a memory location in the host computer, wherein the second network interface controller has no knowledge of the identifier and the associated data field, and wherein the first network interface controller and the second network interface controller operate under a Remote Direct Memory Access (RDMA) protocol;

extracting the identifier from the received packet;

after the identifier has been extracted from the received packet, passing the identifier associated with the memory location to an RDMA program component of the host computer;

querying, by the RDMA program component, the first network interface controller for a list of valid identifiers generated by the first network interface controller and associated memory locations, wherein each identifier from the list of valid identifiers is associated with a memory location in a memory of the host computer;

searching the list of valid identifiers for the identifier;

when the list of valid identifiers includes the identifier received from the remote computer, receiving, by the second network interface controller, the memory location associated with the identifier, wherein the second network interface controller subsequently transmits the associated data field to the memory location, and invalidates the identifier; and when the list of valid identifiers does not include the identifier received from the remote computer, invalidating the identifier received from the remote computer and discarding the associated data field.

17. The computer readable storage medium of claim 16, wherein the identifier is invalidated under control of a bit field added to the identifier and the associated data field received from the remote computer.

18. The computer readable storage medium of claim 16, wherein the memory comprises Random Access Memory.

19. The computer readable storage medium of claim 16, wherein the program component is a computer operating system.

20. The computer readable storage medium of claim 16, wherein the first network interface controller and the second network interface controller operate under the RDMA protocol over TCP/IP protocol.

* * * * *